Oct. 28, 1952 J. McK. BINDLEY 2,615,368
BALL AND SOCKET MOUNTING FOR MIRRORS AND THE LIKE
Filed Feb. 27, 1950 2 SHEETS—SHEET 1

INVENTOR.
JAMES McK. BINDLEY
BY
Oberlin + Limbach
ATTORNEYS.

Oct. 28, 1952  J. McK. BINDLEY  2,615,368
BALL AND SOCKET MOUNTING FOR MIRRORS AND THE LIKE
Filed Feb. 27, 1950  2 SHEETS—SHEET 2
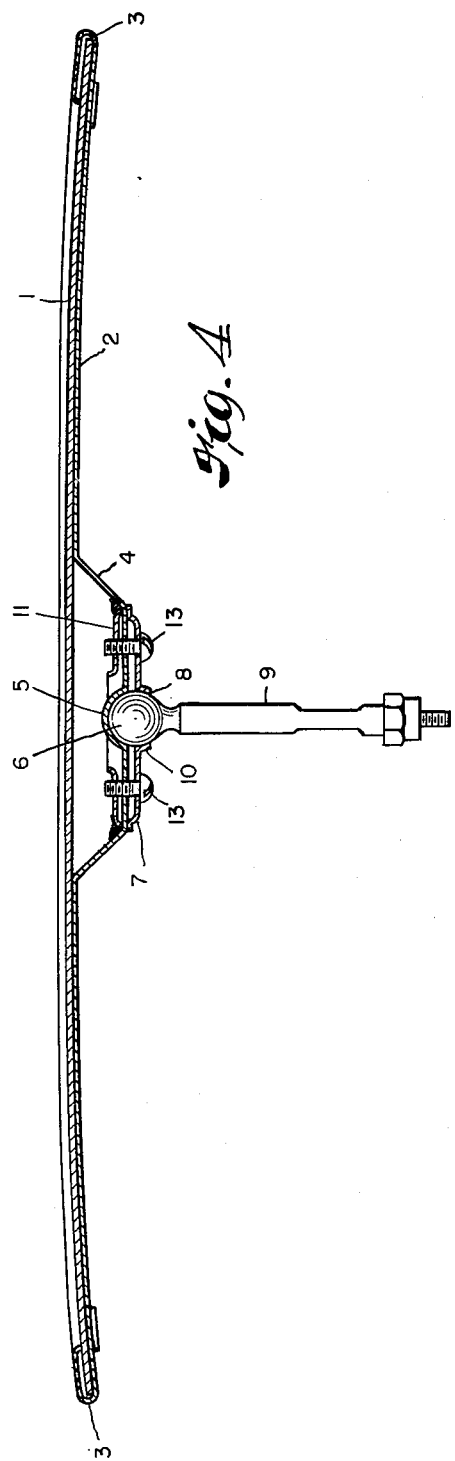
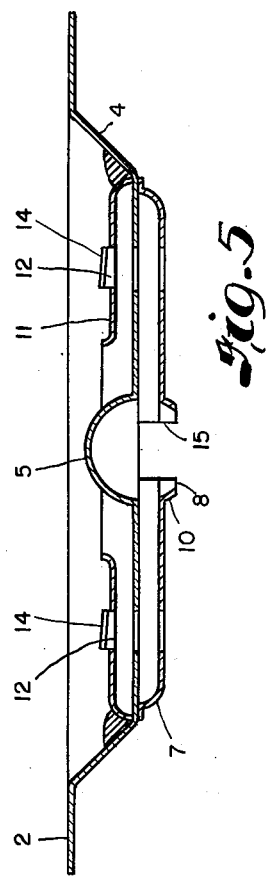
INVENTOR.
JAMES McK. BINDLEY
BY
Oberlin & Limbach
ATTORNEYS.

Patented Oct. 28, 1952

2,615,368

UNITED STATES PATENT OFFICE 2,615,368

BALL AND SOCKET MOUNTING FOR MIRRORS AND THE LIKE

James McK. Bindley, East Cleveland, Ohio

Application February 27, 1950, Serial No. 146,533

2 Claims. (Cl. 88—98)

This invention relates, as indicated, to mirror mountings, and more particularly to a ball and socket type mounting therefor.

Swivel-type mountings for mirrors are, of course, well known to all. The ordinary automobile rear-vision mirror is probably the best known example of a mirror thus mounted. Rear-vision mirrors are commonly supported by a holder which curves or bulges rearwardly to form a housing adapted to accommodate a ball and socket joint therebetween. An aperture of somewhat greater diameter than the stem of the ball is provided in the back of the holder with the marginal edge thereof flared rearwardly to provide a seat for the ball. A resilient metal strip is secured within the holder to press on the ball and thus frictionally clamp the latter against its seat. The prior art construction thus described is deficient in two main particulars. First, such mirrors are rather thick and bulky, and secondly, due to the manner of construction, they are difficult of assembly or disassembly. It is, of course, highly important with all types of automotive accessories that the same be adapted for compact packaging and shipment but nevertheless be readily assembled and installed.

One object of this invention, therefore, is to provide a ball and socket mounting for rear-vision mirrors and the like which is inexpensive of manufacture and which, together with such mirror, forms a relatively thin compact unit.

A further object is to provide a ball and socket mounting which requires a minimum of fittings on the outside of the mirror back and which may be easily and quickly assembled or disassembled.

Still another object is to provide a ball and socket mounting which requires little or no adjustment notwithstanding reasonable wear and vibration.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawing:

Fig. 4 is a sectional view taken along the line 4—4 on Fig. 1, with the mirror being slightly curved as shown; and Fig. 5 is an enlarged detail section of the socket mounting shown in Fig. 4 with ball and stem removed.

Figure 1:
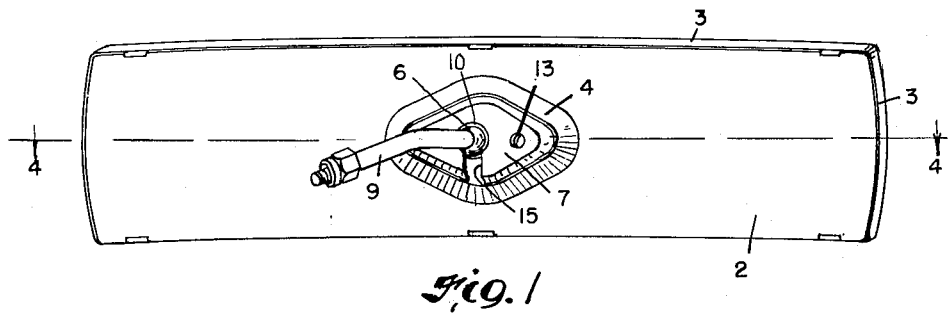
Fig. 1 is a perspective view of a mirror showing the ball and socket mounting therefor.
Figure 2:
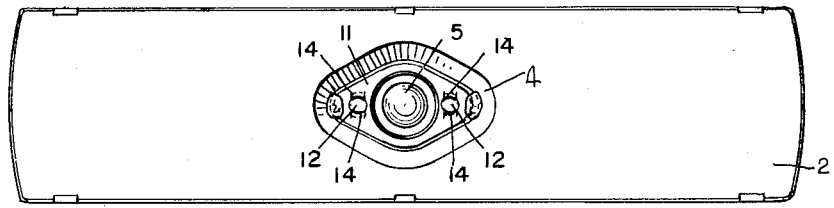
Fig. 2 is a front view of the mirror holder with the mirror removed.
Figure 3:
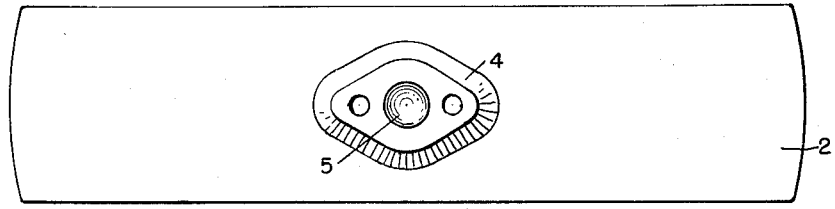
Fig. 3 is a rear view of such mirror holder with the ball and outer clamping member therefor removed.

Referring now to the drawing and more particularly to Fig. 1 thereof, the ball and socket joint of my invention is there shown as it is employed to mount a thin, slightly curved rear-view mirror 1. A generally rectangular mirror holder in the form of a metal stamping 2 is provided with forwardly turned flanges 3 which embrace and grip the mirror. Such stamping 2 has an outwardly extending offset portion or bulge 4 formed approximately centrally thereof having a cup-shaped depression 5 therein protruding inwardly into the recess defined by such offset. The depression 5 is formed to a depth somewhat less than its radius of curvature and is adapted to seat a ball 6.

Secured to the outer side of the offset portion 4 is a thin, resilient annular stamping 7, the inner marginal edge 8 of which is of somewhat greater diameter than the diameter of the stem 9 of the ball, such edge being flared rearwardly likewise to provide a depression or complementary seat 10 for such ball. The ball is thus held within the depressions 5 and 10, the natural resilience of the outer stamping 7 serving to clamp the ball firmly, yet resiliently, in its socket. As shown, stem 9 may be provided with a constricted neck adjacent the ball to increase the degree of swivel action obtainable.

A generally flat annular sheet-metal ring 11 soldered to such offset portion in the recess defined thereby and encircling the depression 5 is provided with a pair of apertures 12 of the self-locking, or speed-nut, type which are adapted threadedly to receive screws 13 which pass through openings in the annular stamping 7 and offset portion of the mirror holder, thus locking such latter two members securely but resiliently together. The apertures 12 are formed by generally diametrically opposed prongs 14 which extend inwardly with inner marginal edges which are helically disposed to form approximately 360°, or one turn, of thread. When screws 13 are secured in their respective apertures, the prongs 14 will be drawn slightly toward stamping 2, retaining such screws securely nothwithstanding the vibration which may be expected in auto travel. Since ring 11 encircles depression 5, it requires no additional space between the mirror and the mirror back or holder. The "nut" openings therein are fixedly positioned relative to the corresponding openings in the holder so that the ball and socket assembly may be quickly secured in place without any "fishing" for internal attaching means. Ring 11 will be soldered to the holder at two spaced points, rigidly positioning the same and overcoming the tendency of individual nuts to come loose and become "lost" within the casing. The ring, furthermore, may have a degree of resilience of its own additionally assisting in clamping the ball in desired manner.

The outer annular stamping 7 is cut away somewhat at the bottom leaving a notch 15 to permit the mirror to be pivoted into a plane parallel to the stem 9 of the ball to permit extreme swiveling of the mirror when the latter is to be mounted over the dashboard of an automobile, for example. When packaging the mirror assembly for shipment, stamping 7 may be detached and the parts packed in a very small carton since the mirror holder is quite thin and flat.

It will be apparent from the foregoing that the objects of this invention have been achieved in a simple and inexpensive manner: a very thin swivel-mounted mirror is produced; the units are readily disassembled for shipment in a carton of minimum size; the socket construction serves to grip the ball firmly but resiliently over a considerable portion of its periphery; and the parts may be quickly assembled.

Other modes of applying the principle of the invention may be employed, change being made as regards the details described, provided the features stated in any of the following claims or the equivalent of such be employed.

I therefore particularly point out and distinctly claim as my invention:

1. A rear-vision mirror assembly comprising an elongated mirror, a shallow metal stamping enclosing the back of said mirror and with the latter secured therein, said stamping having an outwardly bulged portion generally centrally thereof with an inwardly directed generally hemispherical depression in such bulge, a ball adapted to fit in such depression and provided with a stem for mounting the same, a thin, resilient sheet metal stamping adapted to fit over said ball and provided with a central opening to accommodate said stem, the portion of said latter stamping around such opening being outwardly flared to engage and seat said ball in a region generally opposed to such hemispherical depression, a resilient flat sheet metal ring within such bulge in said first stamping and encircling such depression, said ring being soldered in such position at spaced points of attachment, spaced opposed apertures in said two stampings for insertion of screws therethrough, and aligned speed-nut type apertures in said flat ring adapted threadedly to engage such screws to secure said second stamping in resilient clamping engagement with said ball, such central opening in said second stamping being cut away at one side to permit swinging of said stem into position generally parallel to said mirror.

2. A mirror assembly comprising a mirror, a shallow metal stamping enclosing the back of said mirror and with the latter secured therein, said stamping having an outwardly bulged portion generally centrally thereof with an inwardly directed generally hemispherical depression in such bulge, a ball adapted to fit in such depression and provided with a stem for mounting the same, a thin resilient sheet metal stamping adapted to fit over said ball and provided with an opening to accommodate said stem, the portion of said latter stamping around such opening being outwardly flared to engage and seat said ball in a region generally opposed to such hemispherical depression, a resilient sheet metal ring within such bulge in said first stamping and encircling such depression, said ring being secured in such position at spaced points of attachment, spaced opposed apertures in said two stampings for insertion of screws therethrough, and aligned speed-nut type apertures in said sheet metal ring adapted threadedly to engage such screws to secure said second stamping in resilient clamping engagement with said ball.

JAMES McK. BINDLEY.

REFERENCES CITED

The following references are of record in the file of this patent:

UNITED STATES PATENTS

| Number | Name | Date |
|---|---|---|
| 1,823,636 | Winkler et al. | Sept. 15, 1931 |
| 1,992,828 | La Hodny et al. | Feb. 26, 1935 |
| 2,089,463 | Ritz-Woller | Aug. 10, 1937 |